United States Patent Office
3,824,248
Patented July 16, 1974

3,824,248
POLY-HYDROXY-BIS-OXAZOLINES WITH HYDROXY GROUPS SUBSTITUTED WITH URETHANE GROUPS LINKED TO BETA-ETHYLENIC UNSATURATED GROUPS
Jean-Claude Mileo, Bernard Sillion, and Gabriel de Gaudemaris, Grenoble, France, assignors to Institut Francais du Petrole, des Carburants et Lubrifiants et Commissariai a l'Energie Atomique
No Drawing. Filed Feb. 3, 1972, Ser. No. 223,336
Claims priority, application France, Feb. 3, 1971, 7103684
Int. Cl. C07d 85/36
U.S. Cl. 260—307 F
12 Claims

ABSTRACT OF THE DISCLOSURE

Poly-hydroxy-bis-oxazolines may have their hydroxy groups substituted with urethane groups linked to $\alpha,\beta$-ethylenic unsaturated groups. The resulting new compounds may be admixed with vinyl monomers to provide coating compositions which may be applied onto supports and hardened by irradiation with ionizing rays.

This invention relates to coatings and particularly to coatings hardenable by irradiation.

The development of electron accelerators of moderate energy (200–750 kev.) has contributed during the last years to an increased interest in a particular aspect of the polymerization induced by ionizing radiation, i.e. the hardening of varnish films or paints.

The main advantage of this technique is to allow a quick hardening of the treated compositions, even at room temperature, which is particularly advantageous when the compositions are applied as films on a substrate.

It is thus particularly advantageous to manufacture substances which may be co-polymerized with vinyl monomers to provide hardened compositions, the properties of which are always better adapted to the expected uses.

The invention provides new compounds which may be co-polymerized with vinyl monomers, said compounds consisting of hydroxy-bis-oxazolines modified by urethane linkages, the latter being themselves terminated by groups with $\alpha,\beta$-ethylenic unsaturation.

Another object of this invention is to provide an advantageous process for manufacturing these new compounds.

The invention is also concerned with the production of new coating compositions consisting of mixtures of modified hydroxy bis-oxazolines and at least one vinyl monomer, these compositions being useful as varnishes, lakes or binders for paints, or also for manufacturing laminates or shaped articles.

The invention also concerns an advantageous process for hardening said coating compositions by ionizing radiation and particularly by means of an electron beam of moderate energy.

Finally it relates to a process for manufacturing new hardened compositions.

As a rule, the compounds of this invention are poly(di- or tetra-) hydroxy bis-oxazolines, at least two hydroxy groups of which are substituted by urethane bonds terminated by $\alpha,\beta$-ethylenic unsaturated groups.

They will be referred to as prepolymers or prepolymers with controlled unsaturation. Those which are derivatives of dihydroxy bis-oxazolines have the formula:

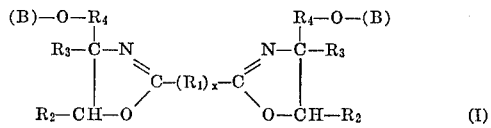
(I)

in which $R_1$ is a divalent aliphatic, alicyclic or aromatic hydrocarbon radical which preferably contains 1–48 carbon atoms, and, for example, 1–20 carbon atoms or more, the number $x$ being 0 or 1.

$R_2$ and $R_3$ are each a hydrogen atom or a monovalent aliphatic, alicyclic or aromatic hydrocarbon radical with preferably 1–10 carbon atoms.

$R_4$ is a divalent aliphatic, alicyclic or aromatic hydrocarbon radical with preferably 1–10 carbon atoms.

(B) has the general formula:

$$CH_2=C-(X)-CO-NH-R-NH-CO-$$
$$\phantom{CH_2=C-}|$$
$$\phantom{CH_2=C-}Y$$

in which R is a divalent aliphatic, alicyclic, aromatic or alkylaromatic hydrocarbon radical which preferably contains 6–20 carbon atoms, and

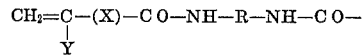

is the radical of a vinyl compound with mobile hydrogen of the type

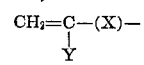

in which said mobile hydrogen is one of a hydroxy, amino, amido or carboxylic group, Y being a hydrogen atom, a halogen atom or an alkyl, preferably methyl group.

Preferably the vinyl compound has a mobile hydrogen of a hydroxy group; in this case (X) is a divalent group such as:

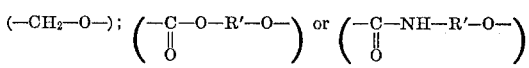

in which R' is a divalent hydrocarbon radical, for example an aliphatic or alicyclic one.

The following radicals are examples of radicals $R_1$: methylene, dimethylene, trimethylene, tetramethylene, pentamethylene, decamethylene, undecamethylene, 1,2-cyclopentylene, 1,3-cyclopentylene, 1,2-cyclohexylene, 1,3-cyclohexylene, 1,4-cyclohexylene, ortho-phenylene, meta-phenylene and para-phenylene, and also the divalent radicals from dimeric fatty acids, for example dioleic acid, dilinoleic acid, dilinolenic acid and their saturated homologs.

$R_2$ and $R_3$ are illustrated by the following radicals: methyl, ethyl, propyl, pentyl, undecyl, phenyl, tolyl, naphthyl, cyclohexyl, methylcyclohexyl and cyclopentyl.

$R_4$ may be, for example, methylene, ethylene, propylene, 1,2-phenylene, 1,3-phenylene or 1,4-phenylene, methylene-phenylene, cyclohexylene or methylene-cyclohexylene.

The compounds of formula (I) according to this invention may be manufactured from a hydroxy-bis-oxazoline, a monomeric di-isocyanate and a convenient vinyl compound.

The hydroxy-bis-oxazoline has the formula:

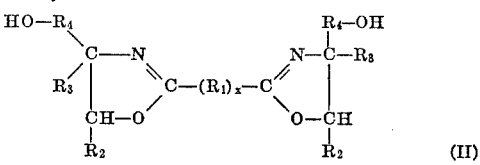
(II)

in which $R_1$, $R_2$, $R_3$, $R_4$ and $x$ are as hereinbefore defined.

It may be itself manufactured by reacting a dicarboxylic acid of the general formula $HOOC—(R_1)_x—COOH$ or a derivative thereof, for example an ester, a halide or an anhydride, with an amino-alcohol of the general formula:

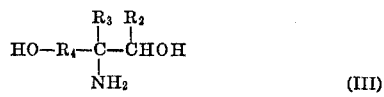
(III)

In these formulae $R_1$, $R_2$, $R_3$, $R_4$ and $x$ are as defined above.

The following amino-alcohols are mentioned by way of examples:

2-amino-2-methyl-1,3-propanediol;
2-amino-2-ethyl-1,3-propanediol;
2-amino-2-propyl-1,3-propanediol;
2-amino-2-butyl-1,3-propanediol;
2-amino-2-phenyl-1,3-propanediol;
2-amino-2-decyl-1,3-propanediol;
2-amino-2-tolyl-1,3-propanediol;
2-amino-2-xylyl-1,3-propanediol;
2-amino-2-naphthyl-1,3-propanediol;
2-amino-2-methyl-1,4-butanediol;
2-amino-2-ethyl-1,4-butanediol;
2-amino-2-propyl-1,4-butanediol;
2-amino-2-octadecyl-1,4-butanediol;
2-amino-2-ethylolnaphthyl-1-ethanol;
2-amino-2-ethylolcyclohexyl-1-ethanol;
2-amino-2-cyclohexyl-1,3-propanediol;
3-amino-2,7-dihydroxy-octane.

The following dicarboxylic acids are mentioned by way of examples: oxalic, malonic, succinic, glutaric, adipic, pimelic, suberic, azelaic, sebacic, undecanedioic, dodecanedioic, brassylic, 2,2,4 (or 2,4,4)-trimethyl-adipic, 3-tert-butyl adipic, 2-alkyl adipic, 1,4-cyclohexane dicarboxylic, phthalic, isophthalic, terephthalic, 4,4′-diphenyl-ether-dicarboxylic and the saturated or olefinic diacids obtained by dimerisation of fatty acids such as dioleic acid, dilinoleic acid, dilinolenic acid or their saturated homologs.

The compounds which are manufactured from tetra-hydroxy-bis-oxazolines are of the formula:

$$(B')-O-R_4 \quad\quad R_4-O-(B')$$
$$(B')-O-R'_4-C-N\diagdown\quad\diagup N-C-R'_4-O-(B')$$
$$\quad\quad\quad\quad\quad C-(R_1)_x-C$$
$$R_2-CH-O\diagup\quad\diagdown O-CH-R' \quad (IV)$$

in which $R_1$, $R_2$, $R_4$ and $x$ are as hereinbefore defined, $R'_4$ is defined as $R_4$ and B′ is a hydrogen atom or a group (B), provided that at least two of the (B′) are groups (B).

These compounds may be manufactured from tetrahydroxy-bis-oxazolines of the general formula:

$$HO-R_4 \quad\quad R_4-OH$$
$$HO-R'_4-C-N\diagdown\quad\diagup N-C-R'_4-OH$$
$$\quad\quad\quad\quad C-(R_1)_x-C$$
$$R_2-CH-O\diagup\quad\diagdown O-CH-R_2 \quad (V)$$

in which $R_1$, $R_2$, $R_4$, $R'_4$ and $x$ are as hereinbefore defined.

These tetrahydroxy-bis-oxazolines may be obtained by reacting a dicarboxylic acid of the formula $$HOOC-(R_1)_x-COOH$$

for example one of those mentioned above, or a derivative thereof such as an ester, a halide or an anhydride, with an amino-alcohol of the general formula:

$$HO-R'_4 \quad R_2$$
$$HO-R_4-C-CHOH$$
$$\quad\quad NH_2 \quad (VI)$$

in which $R_1$, $R_2$, $R_4$, $R'_4$ and $x$ are as hereinbefore described.

2-amino-2-hydroxymethyl-1,3-propanediol is an example of an amino-alcohol of formula (VI).

The bis-oxazolines of the formulae (II) and (V) may be manufactured from stoichiometrical amounts of the reactants, i.e. 2 moles of amine per mole of the dicarboxylic compound.

The compounds of formula (I) could be manufactured from one mole of bis-oxazoline of the formula (II) and two moles of a di-isocyanate of the formula $$OCN-R-NCO$$

in which R is as hereinbefore defined, so as to form a bis-oxazoline-bis-urethane, the two free isocyanate groups of which may be reacted with the convenient vinyl compound.

Such a method may be satisfactory in particular cases. However since the bis-oxazolines of the formula (II) are highly reactive with the isocyanates, depending on the nature and steric bulk of the group $R_1$, the reaction could lead, in the first step, to insoluble cross-linked polymers. On the other hand, this method cannot be used when only one part of the hydroxy groups of a bis-oxazoline of the formula (V) is to be reacted.

According to this invention, a preferred method consists in first reacting the di-isocyanate OCN—R—NCO with a vinyl compound which contains a mobile hydrogen:

$$CH_2=C-(X)-H$$
$$\quad\;\; |$$
$$\quad\;\; Y$$

as hereinbefore defined, so as to form the mono-addition derivative of the di-isocyanate, which derivative is subsequently reacted with a poly-hydroxy-bis-oxazoline of the formula (II) or (V).

Irrespective of the type of poly-hydroxy-bis-oxazoline employed, at least two of its hydroxy groups will be reacted with the derivative resulting from the mono-addition of the vinyl compound onto the di-isocyanate.

The following vinyl compounds may be reacted with the diisocyanate: for example 2-hydroxyethyl acrylate, 2-hydroxypropyl acrylate, 2-hydroxyethyl methacrylate, 2-hydropropyl methacrylate, allyl alcohol, acrylamide, methacrylamide, N-hydroxyethyl acrylamide, acrylic acid and methacrylic acid. Vinyl compound is intended to have a broad meaning and to include both an acrylic compound and a non-acrylic compound.

The di-isocyanate may be, for example, 1,4-benzene-di-isocyanate,
2,4 (or 2,6)-toluene-di-isocyanate,
4,4′-biphenylene-di-isocyanate,
3,3′-di-methyl-4,4′-biphenylene-di-isocyanate,
1,5-naphthalene-di-isocyanate,
bis(4-isocyanato-phenyl)methane,
bis(4-isocyanato-phenyl) ether,
bis(4-isocyanato-phenyl) sulfone,
bis-2,2′-(4-isocyanato-phenyl)propane,
hexamethylene-di-isocyanate, and
decamethylene-di-isocyanate.

The selected di-isocyanate is dissolved either into an organic solvent which is inert with respect to the reactants and the prepolymer to be prepared, for example into benzene, toluene or xylene, or into an organic solvent itself consisting of a vinyl compound such as styrene; the latter embodiment is preferred since it makes the further operations easier.

The reactive vinyl compound is slowly added to this solution of the di-isocyanate under stirring and at such a rate that the temperature remains lower than 50° C. and preferably lower than 35° C., the respective amounts of the vinyl compound and the di-isocyanate being such that their molar ratio is about 1/1.

The resulting addition compound is slowly added, under stirring, to a poly-hydroxy-bis-oxazoline in a ratio of 2 moles per mole of the bis-oxazoline of the formula (II) and from 2 to 4 moles per mole of the bis-oxazoline of the formula (V), the temperature being also maintained below 50° C. and preferably below 35° C. When all the free isocyanate groups have reacted with the hydroxy groups of the bis-oxazoline, this being easily controlled, for example, by infra-red spectroscopy, there is obtained a prepolymer with a controlled unsaturation, according to the invention; the latter may be recovered, for example, by settling in a non-solvent such as, for example, petroleum ether. It may be stored, as a powder, before use.

These reactions may be carried out in the presence of catalysts, for example, cobalt naphthenate, triethylamine, N-methyl pyrrolidine, N-methyl morpholine, N,N-dimethyl aniline, N,N-diethyl aniline, N,N-dimethyl para-toluidine and manganese octoate.

The unsaturated prepolymers of this invention may be co-polymerized with various monomers, for example, vinyl monomers. The mixtures of these unsaturated prepolymers with vinyl monomers, which may be co-polymerized to give hardened resins, constitute film-forming resins useful as coating compositions and particularly as varnishes or binders for paints.

Thus the film-forming resins of this invention comprise at least one prepolymer, which has a controlled unsaturation, and at least one monomer with a $CH_2=C<$ group. This monomer may represent, for example, from 10 to 90%, preferably from 15 to 60% and more preferably from 25 to 45% of the weight of the composition.

The unsaturated monomer may be, for example: an α-olefine; an acrylic or methacrylic compound, for example, methyl, ethyl, propyl, butyl, 2-ethyl-hexyl or cyclohexyl acrylate or methacrylate, ethylene glycol or butlene glycol di-methacrylate, glycerol tri-methacrylate, trimethylolpropane tri-methacrylate, acrylonitrile, acrylic or methacrylic acid, β-diethylaminoethyl methacrylate or glycidyl methacrylate; a vinyl compound such as, for example, a vinyl halide or a vinylidene halide (for example vinyl chloride), vinyl acetate, vinyl propionate, vinyl laurate, N-vinyl caprolactam, N-vinyl butyrolactam, N-vinyl succinimide, methyl vinyl ketone, vinyl pyridine, vinyl isobutyl ether, styrene, methyl-styrene, vinyl naphthalene or divinyl benzene; or an allyl compound such as, for example, allyl alcohol, trimethylol propane di-allyl ether, tri-allyl cyanurate or di-allyl phthalate.

The coating compositions of this invention may also contain, in addition to the unsaturated pre-polymer obtained from the bis-oxazoline and to the copolymerizable vinyl monomer, other saturated or unsaturated resins, to give them specific properties. As examples of such resins, the following may be mentioned: polymers with pendant acrylic unsaturations, unsaturated polyesters, for example glycol polyphthalomaleate; vinyl resins, phenolic resins or modified epoxy resins.

The invention also comprises the coating compositions such as hereinbefore defined which further contain monomeric plasticizer derivatives, heat- or U.V-stabilizers and various pigments or charges.

When the unsaturated prepolymer of this invention is manufactured in a vinyl solvent such as, for example, styrene, the mixture obtained by reacting the bis-oxazoline with the addition compound of the di-isocyanate onto the reactive vinyl monomer may constitute a film-forming resin according to the invention; it is not necessary, in that case, to separate the prepolymer, unless the latter is to be used later.

The new compositions may be applied onto substrates of various nature, e.g. wood, metal, plastic, glass, asphalt or concrete, before being subjected to the hardening conditions and/or agents.

The hardening is usually carried out by cross-linking radical co-polymerization which may be carried out according to conventional techniques, for example by using conventional initiators such as peroxides, hydroperoxides, certain per-salts or azoic compounds, optionally with activators such as cobalt naphthenate or dibutyl-tin acetate, at a more or less high temperature.

However the compositions of this invention may be hardened by ionizing rays, i.e. by radio-chemical co-polymerisation, under room atmosphere. The main advantage of this process is to allow a quick hardening of the treated compositions at room temperature, which is particularly useful when the compositions are applied as films onto a substrate.

An advantage of using the coatings of this invention is that air does not modify substantially the co-polymerization reaction and the quality of the final product, so that it is not absolutely necessary to provide an inert atmosphere, to use technological substitutes such as applying an organic or metallic film onto the coating to be hardened, or to make use of additives, such as allyl derivatives, for example trimethylol propane di-allyl ether, employed for hardening in open-air.

This preferred hardening method consists in subjecting the coating compositions of the invention to an electron-beam of an energy in the range of about 100,000 to 750,000 electron volts.

These compositions may contain catalysts in order to lower the dose necessary for hardening, for example phosphines or arsines. Other types of rays may be used such as, for example, γ-rays or X-rays.

The following examples are given by way of illustration, not of limitation.

EXAMPLE 1

4,4'-dihydroxymethyl-4,4'-dimethyl-2,2'-tetramethylene-bis-oxazoline 175 cc. of xylene and 100 cc. of meta-cresol having 73.1 g. (0.5 mole) of adipic acid and 105.1 g. (1 mole) of 2-amino-2-methyl-1,3-propanediol dissolved therein, are heated at reflux under a nitrogen atmosphere, in a flask provided with mechanical stirring means and a Dean and Stark separator with cooling device. The theoretical amount of water is evolved in about 15 hours. The reaction mixture is then concentrated in vacuo to eliminate xylene and a meta-cresol fraction, then the remaining viscous solution is poured into an excess of ether. A white product separates which, after filtration, two ether washings and drying, has a weight of 102.4 g. (yield: 72%). It is recrystallized in a mixture of 1 part by volume of ethanol with 9 parts by volume of acetone. It has a melting point of 115.5–117.5° C. and the raw formula $C_{14}H_{24}N_2O_4$. The elementary analysis gives:

Calculated (percent): C, 59.13; H, 8.51; N, 9.85. Found (percent): C, 59.45; H, 8.68; N, 9.87.

EXAMPLE 2

4,4'-dihydroxymethyl-4,4'-dimethyl-2,2'-octamethylene bis-oxazoline

Example 1 is repeated, except that adipic acid is replaced by 101.1 g. (0.5 mole) of sebacic acid. 138 g. (yield: 81.1%) of product is obtained. It is recrystallized from methylene chloride. It has a melting point of 103–105° C. and a raw formula $C_{18}H_{32}N_2O_4$. The elementary analysis was as follows:

Calculated (percent): C, 63.5; H, 9.47; N, 8.23. Found (percent): C, 63.54; H, 9.45; N, 8.40.

EXAMPLE 3

4,4'-dihydroxymethyl-4,4'-dimethyl-2,2'-metaphenylene bis-oxazoline

Example 1 is repeated, except that adipic acid is replaced by 83.1 g. (0.5 mole) of isophthalic acid. 76.1 g. (yield: 50%) of product is obtained, which is recrystallized in 95% ethanol. The melting point is 183–184° C. The elementary analysis for $C_{16}H_{20}N_2O_4$ is as follows:

Calculated (percent): C, 63.14; H, 6.62; N, 9.21. Found (percent): C, 63.18; H, 7.29; N, 9.07.

EXAMPLE 4

4,4'-dihydroxymethyl-4,4'-dimethyl-2,2'-heptamethylene bis-oxazoline

Example 1 is repeated, except that adipic acid is replaced by 94.11 g. (0.5 mole) of azelaic acid. 114.2 g. (yield: 70%) of product are obtained, which is recrystallized in acetone. The melting point is 98–99° C. The elementary analysis for the raw formula $C_{17}H_{30}N_2O_4$ was:

Calculated (percent): C, 62.55; H, 9.26; N, 8.58. Found (percent): C, 62.35; H, 9.25; N, 8.50.

EXAMPLE 5

4,4, 4',4'-tetrahydroxymethyl bis-oxazoline derivative of 10–14 Empol (trademark)

212.7 g. of dimeric fatty acid available in the trade as "Empol 10–14" (experimentally determined acid number: 195) and 89.6 g. (0.74 mole) of 2-aminio-2-hydroxymethyl-1,3-propanediol are introduced into a flask fit with a mechanical stirrer, a nitrogen bubbling tube and a short column connected to a descending cooler. The mixture is heated up to 180° C. in 2 hours, and then maintained at this temperature as long as the theoretical amount of water is not eliminated and the acid number of the mixture does not average zero, i.e. for about 10–24 hours.

The resulting product is a very viscous liquid whose infra-red spectrum conforms to the expected structure and whose elemental analysis is the following:

Found (percent): C, 71.82; H, 11.11; N, 3.70.

EXAMPLE 6

Manufacture of a pre-polymer which has oxazoline, urethane and acrylic groups 15.61 grams (0.12 mole) of β-hydroxypropyl acrylate dissolved in 30 cc. of anhydrous benzene are introduced into a flask fitted with a mechanical stirring device, an addition funnel, a thermometer and an ascending cooler with calcium chloride protection. A solution of 20.9 g. (0.12 mole) of 2,4-toluene-diisocyanate in 15 cc. of anhydrous benzene is added thereto under inert atmosphere at such a velocity that the temperature in the flask is maintained lower than 30° C.

The mixture is stirred for about 20 hours at room temperature. 20.43 g. (6.10$^{-2}$ mole) of 4,4'-dihydroxymethyl-4,4'-dimethyl - 2,2' - octamethylene-bis-oxazoline, manufactured as described in Example 2, and 30 cc. of benzene are added thereto. After stirring for 2 hours at room temperature, the mixture is heated for 7 hours to about 35–40° C. and stirred for one night at room temperature. The I.R. spectrum of the resulting solution shows no isocyanate is present. The solution is poured into a large excess of ligroin. The precipitate is filtered off, crushed, washed several times with ligroin and dried. It amounts to 53 g. (yield: 93.1%). The product decomposes before melting. The raw formula is $C_{48}H_{64}N_6O_{14}$. Finally, the elementary analysis gives:

Calculated (percent): C, 60.74; H, 6.79; N, 8.85.
Found (percent): C, 60.76; H, 7.19; N, 8.75.

EXAMPLE 7

A mixture is prepared, which consists of 50% of the prepolymer of Example 6 and 50% of styrene. This mixture is applied with a brush onto panels of magoon plywood of 5 x 15 cm. which are exposed under room atmosphere to an electron beam of 500,000 electron-volts. The current intensity is 80 microamperes and the coating is placed at 12 cm. from the electron source. Each panel is placed on a carriage whose velocity under the beam is such that the dose received by the coating at each passage is 1 mrad. The coating is hardened and does not stick any more beyond a dose of 3 mrads. However a total dose of 12 mrads is applied thereto. The coating has a bright appearance.

Identical mixtures have been applied as sheets of a 150 microns thickness onto glass panels by means of a filmograph. Hardening is achieved with an identical irradiation dose.

The fluidity of the mixture to be applied may be varied by modifying the styrene content. Mixtures with 40 and 60% of styrene also result, after irradiation, in hardened and non-sticky coatings.

EXAMPLE 8

Example 7 is repeated, except that, instead of pure styrene, the monomeric part of the coating (60% by weight) is a mixture by equal parts of styrene and butyl acrylate.

EXAMPLE 9

Example 7 is repeated, except that, instead of pure styrene, the monomeric part of the coating (60% by weight) is a mixture by equal parts of styrene and vinyl acetate.

EXAMPLE 10

Example 7 is repeated, except that, instead of pure styrene, the monomeric part of the coating (60% by weight) is a mixture by equal parts of styrene and methyl meathacrylate.

EXAMPLE 11

Example 7 is repeated, except that, instead of pure styrene, the monomeric part of the coating (60% by weight) is a mixture of styrene, ethyleneglycol di-methacrylate and butyl methacrylate. The films obtained according to Examples 8 to 11 are hard and non-sticky.

EXAMPLE 12

A solution of 3.484 grams of β-hydroxyethyl acrylate (3.10$^{-2}$ mole) in 5 cc. of styrene is introduced into the same apparatus as in Example 6. A solution of 5.224 g. (3.10$^{-2}$ mole) of 2,4-tolylene d-isocyanate in 5 cc. of styrene is slowly added while maintaiinng the temperature below 30° C. The mixture is stirred up for 20 hours at room temperature. 4.3 g. (1.5·10$^{-2}$ mole plus 1% excess) of 4,4'-dihydroxymethyl-4,4'-dimethyl-2,2'-tetramethylene-bis-oxazoline and then 5 cc. of styrene are added thereto. After stirring for 24 hours at room temperature, the IR spectrum does not indicate the presence of isocyanate.

This composition is poured onto glass and wood plates to form a layer of a 150μ thickness and hardened as in Example 7.

EXAMPLE 13

A solution of 4.79 g. (2.75·10$^{-2}$ mole) of 2,4-tolylene di-isocyanate in 20 cc. of anhydrous toluene is introduced into an apparatus such as described in Example 6. A solution of 3.58 g. (2.75·10$^{-2}$ mole) of 2-hydroxypropyl acrylate in 20 cc. of toluene containing 8 mg. of hydroquinone is added thereto at such a rate that the temperature remains lower than 30° C. The mixture is stirred up for 20 hours at room temperature and then for 3 hours at 40–45° C. This mixture is added in the same way to a solution of 9.31 g. (about 1.25·10$^{-2}$ mole) of the tetra-hydroxy-bis-oxazoline of Example 5 (obtained from "Empol 10–14" and 2-amino-2-hydroxymethyl-1,3-propanediol) in 80 cc. of anyhdrous toluene.

The mixture is then stirred for 20 hours at room temperature and then 3 hours at 40–45° C.

No isocyanate is found in the IR spectrum.

Toluene is separated under reduced pressure and the expected prepolymer is obtained as a white vitrous solid.

EXAMPLE 14

A film-forming composition is manufactured by dissolving 6 g. of the prepolymer of Example 13 in 4 g. of butyl acrylate (40% by weight of the total composition). This composition is applied with a filmograph on panels of stainless steel of 10 x 20 cm., as films of an average thickness of about 80 microns. The panels are irradiated by means of an electron beam produced by an accelerator. The irradiation conditions are the following:

Average energy of the beam: 500 kev.
Current intensity: 80 μa.
Atmosphere: air
Distance from the window to the sample: 7.5 cm.
Speed of the carriage: 2.4 cm./sec.

The coating gets hardened and is no more sticky at a 2 mrad dose. However 8 mrad are applied thereto in 8 passages.

Pencil determined hardness: 3H
Hardness (Persoz pendulum) after 24 hours: 277 seconds.

The coating is bright and extensible.

EXAMPLE 15

Example 14 is repeated, except that the butyl acrylate monomer represents 50% by weight of the film-forming composition. The irradiation is conducted in nitrogen. The coating gets hardened and is no more sticky at a 1 mrad dose. However, a 8 mrad dose is applied thereto in 8 passages.

Average thickness of the coating: 90μ
Immediate hardness (pencil): 3H.

The coating is bright and extensible.

EXAMPLE 16

Example 14 is repeated, except that the monomeric part consists of 4 g. of styrene (40% by weight of the total composition). The irradiation is conducted under nitrogen.

For a dose of 8 mrad in 8 passages:

Average thickness of the dry coating: 90μ
Immediate hardness (pencil): HB.

The coating is bright and extensible.
What we claim is:
1. A compound of the formula

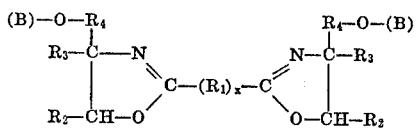

in which $R_1$ is $(CH_2)_{1-20}$ or phenylene, $x$ is one, $R_2$ is hydrogen, $R_3$ is methyl, $R_4$ is methylene, and B has the formula

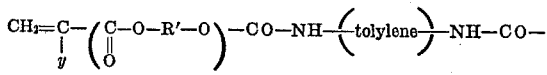

in which R' is

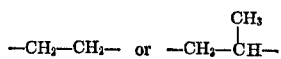

and $y$ is hydrogen or methyl.

2. A compound of the formula

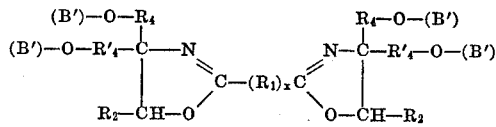

in which $R_1$ is a divalent aliphatic hydrocarbon radical of 34 carbon atoms, $x$ is one, $R_2$ is hydrogen, each of $R_4$ and $R'_4$ is methylene, and B' is hydrogen or a group B of the formula

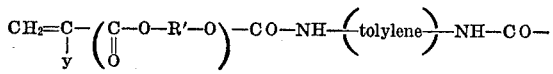

in which R' is

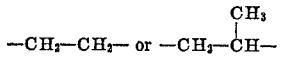

and $y$ is hydrogen or methyl, with the provision that at least 2 B' groups represent B groups.

3. A compound as defined by Claim 1, wherein B is of the formula

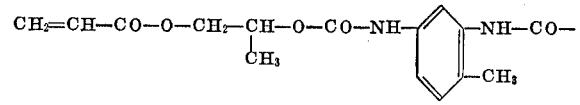

or

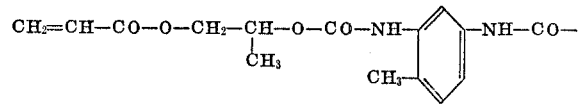

4. A compound as defined by Claim 3, wherein $R_1$ is octamethylene.

5. A compound as defined by Claim 1, wherein $R_1$ is tetramethylene, and B is of the formula

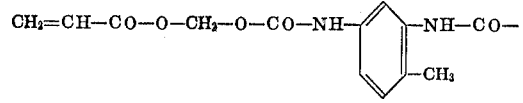

or

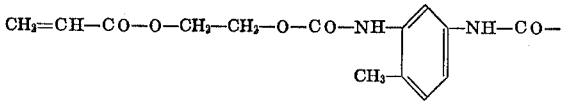

6. A compound as defined by Claim 2, wherein 2–4 of the four (B') are radicals of the formula

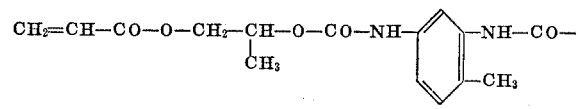

or

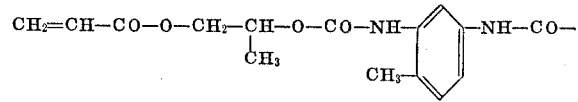

any residual (B') being hydrogen.

7. A compound as defined by Claim 6, wherein of the four (B'), about 2.2 (B') on the average are radicals of the formula

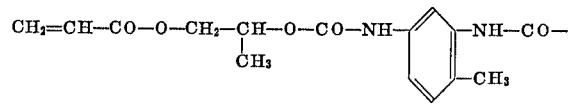

or

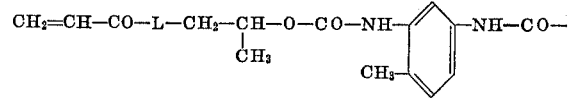

and residual (B') being hydrogen.

8. A process for manufacturing a derivative of a dihydroxy-bis-oxazoline, said process comprising the steps of:

(I) reacting a vinyl compound of the formula

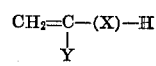

with a diisocyanate of the formula

OCN—R—NCO at a temperature lower than 50° C. in a molar proportion sufficient to form the mono-addition derivative of said diisocyanate wherein X is —CH$_2$—O—; —CO—NH—; —COO—; —COO—R'—O—; or —CONH—R'—O; where R' is

and Y is H or —CH$_3$; R is a divalent aliphatic, alicyclic, aromatic or alkylaromatic radical of 6–20 carbon atoms; and (II) reacting resultant mono-addition derivatives of said diisocyanate at a temperature lower than 50° C. with a dihydroxy bis-oxazoline of the formula

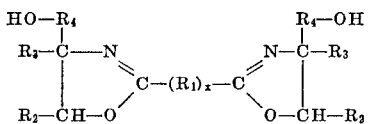

wherein X is 0 or 1, $R_1$ is a divalent aliphatic, alicyclic or aromatic radical of 1–48 carbon atoms, $R_2$ is hydrogen or methyl, $R_3$ is hydrogen or a monovalent aliphatic, alicyclic or aromatic hydrocarbon radical of 1–10 carbon atoms; and $R_4$ is a divalent aliphatic, alicyclic or aromatic radical of 1–10 carbon atoms.

9. A process as defined by Claim 8, wherein both hydroxy groups of the dihydroxy-bis-oxazoline are reacted in step (II).

10. A process for manufacturing a derivative of a tetrahydroxy-bis-oxazoline, said process comprising the steps of:
(I) reacting a vinyl compound of the formula

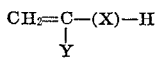

with a diisocyanate of the formula

OCN—R—NCO at a temperature lower than 50° C. in a molar proportion sufficient to form the mono-addition derivative of said diisocyanate wherein X is —CH$_2$—O—; —CO—NH—; —COO—; —COO—R'—O—; or —CONH—R'—O; where R' is

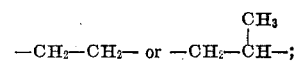

and Y is H or —CH$_3$; R is a divalent aliphatic, alicyclic, aromatic or alkylaromatic radical of 6–20 carbon atoms; and (II) reacting resultant mono-addition derivatives of said diisocyanate at a temperature lower than 50° C. with a tetrahydroxy bis-oxazoline of the formula

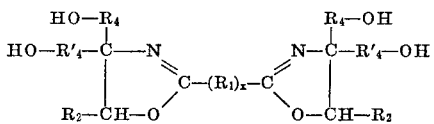

wherein $x$ is 0 or 1, $R_1$ is a divalent aliphatic, alicyclic or aromatic radical of 1–48 carbon atoms, $R_2$ is hydrogen or methyl; and $R_4$ and $R_4'$ are each aliphatic, alicyclic or aromatic radical of 1–10 carbon atoms.

11. A process as defined by Claim 10, wherein 2–4 of the hydroxy groups of the tetra-hydroxy-bis-oxazoline are reacted in step (II).

12 A process as defined by Claim 11, wherein $R_2$ is hydrogen, and $R_4$ and $R_4'$ are each —CH$_2$—.

References Cited

UNITED STATES PATENTS 3,367,895   2/1968   Clark _____ 260—307 F

JOHN D. RANDOLPH, Primary Examiner

U.S. Cl. X.R.

117—121, 124 E, 128.4, 148; 204—159.22; 260—22 CQ, 22 D, 75 R, 75 TN, 80 P, 85.5 B, 86.1 N, 24 OR